(12) United States Patent
Tsuruki et al.

(10) Patent No.: US 9,235,745 B2
(45) Date of Patent: Jan. 12, 2016

(54) SIGNAL PROCESSING DEVICE FOR READER TARGETED TO CODES, SIGNAL PROCESSING METHOD, AND SIGNAL PROCESSING PROGRAM

(71) Applicant: NEC Platforms, Ltd., Kawasaki-shi, Kanagawa (JP)

(72) Inventors: Hiroshi Tsuruki, Tokyo (JP); Masao Gotoh, Tokyo (JP); Hiroshi Shigemitsu, Tokyo (JP); Masato Teraoka, Tokyo (JP)

(73) Assignee: NEC PLATFORMS, LTD, Kawasaki (JP)

( * ) Notice: Subject to any disclaimer, the term of this patent is extended or adjusted under 35 U.S.C. 154(b) by 0 days.

(21) Appl. No.: 14/409,728

(22) PCT Filed: Jun. 25, 2013

(86) PCT No.: PCT/JP2013/067305
§ 371 (c)(1),
(2) Date: Dec. 19, 2014

(87) PCT Pub. No.: WO2014/002972
PCT Pub. Date: Jan. 3, 2014

(65) Prior Publication Data
US 2015/0178541 A1    Jun. 25, 2015

(30) Foreign Application Priority Data
Jun. 28, 2012    (JP) ................. 2012-145651

(51) Int. Cl.
*G06K 5/00*    (2006.01)
*G06K 7/14*    (2006.01)
*G06K 7/10*    (2006.01)

(52) U.S. Cl.
CPC .......... *G06K 7/1473* (2013.01); *G06K 7/10851* (2013.01); *G06K 7/146* (2013.01)

(58) Field of Classification Search
USPC ........................................... 235/437
See application file for complete search history.

(56) References Cited

FOREIGN PATENT DOCUMENTS

| JP | 59-201175 A | 11/1984 |
|----|-------------|---------|
| JP | 62-179072 A | 8/1987  |

(Continued)

OTHER PUBLICATIONS

Malaysia Substantive Examination Adverse Report for MY Application No. PI2014703840 issued on Apr. 3, 2015.

(Continued)

*Primary Examiner* — Rafferty Kelly

(57) ABSTRACT

There is provided a signal processing device for remedying an error in reading bar-codes derived from a defect of the bar-code printed on a label, a way to hold the bar-code reader's sensor to the bar-code and so forth. The signal processing device comprises: a variable amplifier configured to output a signal, as an output signal thereof, corresponding to an input signal, an offset and a gain of the variable amplifier being able to be adjusted; a comparing means configured to compare a level of the output signal of the variable amplifier with a plurality of thresholds; a detecting means configured to detect either or both of a shift of the offset of the variable amplifier and an excess or deficiency of the gain of the variable amplifier based on the result of the comparison executed in the comparing means; and an adjusting means configured to adjust either or both of the offset and the gain of the variable amplifier based on the result of the detection executed in the detecting means.

7 Claims, 6 Drawing Sheets

(56) References Cited

FOREIGN PATENT DOCUMENTS

| JP | 64-59574 | A | 3/1989 |
| JP | 10-63768 | A | 3/1998 |
| JP | 11-338960 | A | 12/1999 |
| JP | 3080624 | U | 7/2001 |
| JP | 2009-259059 | A | 11/2009 |
| JP | 5403714 | B2 | 1/2014 |

OTHER PUBLICATIONS

International Search Report for PCT Application No. PCT/JP2013/067305, mailed on Aug. 6, 2013.

SIGNAL PROCESSING DEVICE FOR READER TARGETED TO CODES, SIGNAL PROCESSING METHOD, AND SIGNAL PROCESSING PROGRAM

This application is a National Stage Entry of PCT/JP2013/067305 filed on Jun. 25, 2013, which claims priority from Japanese Patent Application 2012-145651 filed on Jun. 28, 2012, the contents of all of which are incorporated herein by reference, in their entirety.

TECHNICAL FIELD

The present invention relates to a signal processing device, a signal processing method, and a signal processing program of a reader for codes. Particularly, the present invention relates to a signal processing device, a signal processing method, and a signal processing program of a bar-code reader for bar-codes and a magnetic card reader for magnetic cards.

BACKGROUND ART

Meanwhile, "codes" as referred to in the present application includes a code printed on a label, an exterior surface of a case and so forth, especially a bar-code and a code in a magnetic stripe of a magnetic card.

With respect to a reader for codes, for example, a conventional bar-code reader for bar-codes printed on labels and so forth, there are cases where decode fails because of unevenness of printing of a bar-code and so forth.

Against this problem, PTL 1 discloses a bar-code reading device and a bar-code reading method comprising a counting means for counting the number of data of a light reception signal belonging to each section of a plurality of sections obtained by dividing an amplitude of the light reception signal at a light reception element by predetermined intervals, an integration means for successively integrating the number of data belonging to the sections which are equal to or larger than, in number, a plurality of predetermined amplitudes to set a count value based on the number counted by the counting means of data, and a determination means for determining whether or not any section in which the count value integrated by the integrating means is larger than a predetermined value exists in said sections which are equal to or larger than, in number, the plurality of predetermined amplitudes, and thereby determining that there is not an effective reception signal within a range of large amplitude by an assumed value although there is an extremely large amplitude by regular reflection and so forth and being able to read exactly bar-codes without being effected by background environment such as regular reflection.

Further, PTL 2 discloses a signal processing device comprising a circuit arrangement with an automatic gain control system into which a gain adjustment element as controlled on the basis of an output from a luminescence element is built and thereby performing adequate gain control and solving restriction of resolution of bar-codes and a readable range by effect to reflection light quantity on the basis of a difference between a bar-code reading device to a bar-code.

CITATION LIST

Patent Literature

{PTL 1} Japanese Patent Application Publication No. 2009-259059
{PTL 2} Japanese Utility Model Registration No. 3080624

SUMMARY OF INVENTION

Technical Problem

However, with respect to the conventional bar-code reader, there are cases where a bar-code cannot be decoded and an error in reading arises by the bar-code's defect such as unfulfillment of contrast ratio of black bars/white bars configuring a symbol in part or all of the bar-code. Further, there are cases where an error in reading arises by an abnormal method to let the bar-code reader read in such a way not to hold the bar-code reader's sensor parallel to the bar-code but to incline the bar-code reader's sensor vertically to the bar-code. Specifically, there are cases where part or all of (power voltage) wave shape output from an optical imagery of the bar-code reader is small or where a center of an amplitude of (power voltage) wave shape departs from a center of an operating voltage range, and consequently, data of a portion where the amplitude of (power voltage) wave shape is small or which exists out of the operating voltage range has an absence.

Therefore, the present invention provides a signal processing device, a signal processing method, and a signal processing program for remedying the error in reading bar-codes derived from a defect of a bar-code printed on a label, a way to hold the bar-code reader's sensor and so forth.

Solution to Problem

According to a first aspect of the present invention, there is provided a signal processing device comprising: a variable amplifier configured to output a signal, as an output signal thereof, corresponding to an input signal, an offset and a gain of the variable amplifier being able to be adjusted; a comparing means configured to compare a level of the output signal of the variable amplifier with a plurality of thresholds; a detecting means configured to detect either or both of a shift of the offset of the variable amplifier and an excess or deficiency of the gain of the variable amplifier based on the result of the comparison executed in the comparing means; and an adjusting means configured to adjust either or both of the offset and the gain of the variable amplifier based on the result of the detection executed in the detecting means.

According to a second aspect of the present invention, there is provided a signal processing method comprising: a step in which, a variable amplifier outputs a signal, as an output signal thereof, corresponding to an input signal, an offset and a gain of the variable amplifier being able to be adjusted; a step in which, a comparing means compares a level of the output signal of the variable amplifier with a plurality of thresholds; a step in which, a detecting means detects either or both of a shift of the offset of the variable amplifier and an excess or deficiency of the gain of the variable amplifier based on the result of the comparison executed in the comparing means; and a step in which, an adjusting means adjusts either or both of the offset and the gain of the variable amplifier based on the result of the detection executed in the detecting means.

According to a third aspect of the present invention, there is provided a signal processing program for causing a computer to function as an output signal's wave shape adjusting device for adjusting an output signal from a variable amplifier configured to output a signal, as an output signal thereof, corresponding to an input signal, an offset and a gain of the variable amplifier being able to be adjusted, the program causing the computer to function as: a comparing means configured to compare a level of the output signal of the variable amplifier with a plurality of thresholds; a detecting means configured to detect either or both of a shift of the offset of the variable amplifier and an excess or deficiency of the gain of the variable amplifier based on the result of the comparison executed in the comparing means; and an adjusting means configured to adjust either or both of the offset and the gain of the variable amplifier based on the result of the detection executed in the detecting means.

Advantageous Effects of the Invention

According to the present invention, a decoding which is unabled by defects of the codes or so forth can be enabled by adjusting the output signal from the sensor representing the codes.

DESCRIPTION OF EMBODIMENTS

{Explanation of Configurations}

Figure 1:
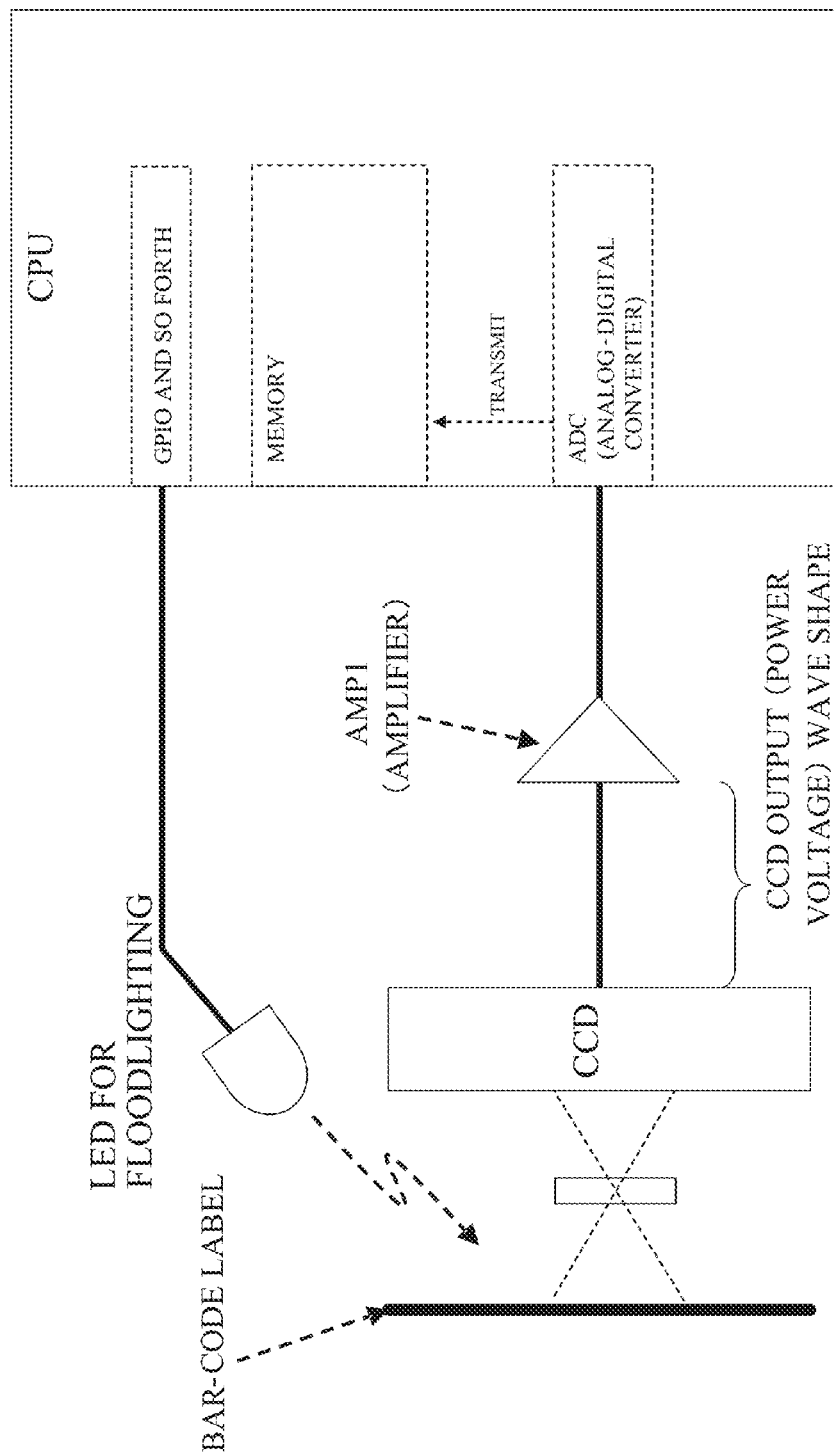
FIG. 1 A figure illustrates a configuration diagram of a normal bar-code reader.

FIG. 1 is a block diagram of a normal bar-code reader. In the normal bar-code reader illustrated in FIG. 1, a wave shape which is obtained by amplifying a (power voltage) wave shape output from a CCD in an amplifier (AMP1 in the FIG. 1) is stored as a power voltage value in a memory by utilizing an analog-digital converter (ADC in the example of FIG. 1). A CPU retrieves power voltage values from the beginning when power voltage values of one line (all of data output per one scan of the bar-code) are stored, determines whether the power voltage value corresponds to a black bar or a white bar (a binarization process), obtains the width of the black (or white) bar and decodes the bar-code (a decode process). If the bar-code complies with a standard related to a contrast ratio and so forth, it is possible to decode the bar-code. However, when reading a bar-code which does not comply with the standard or which becomes nonstandard by degradation over time, or when reading a bar-code abnormally in such a way to incline vertically the bar-code reader's sensor with respect to the bar-code, an absence of data arises at the binarization process.

Figure 2:
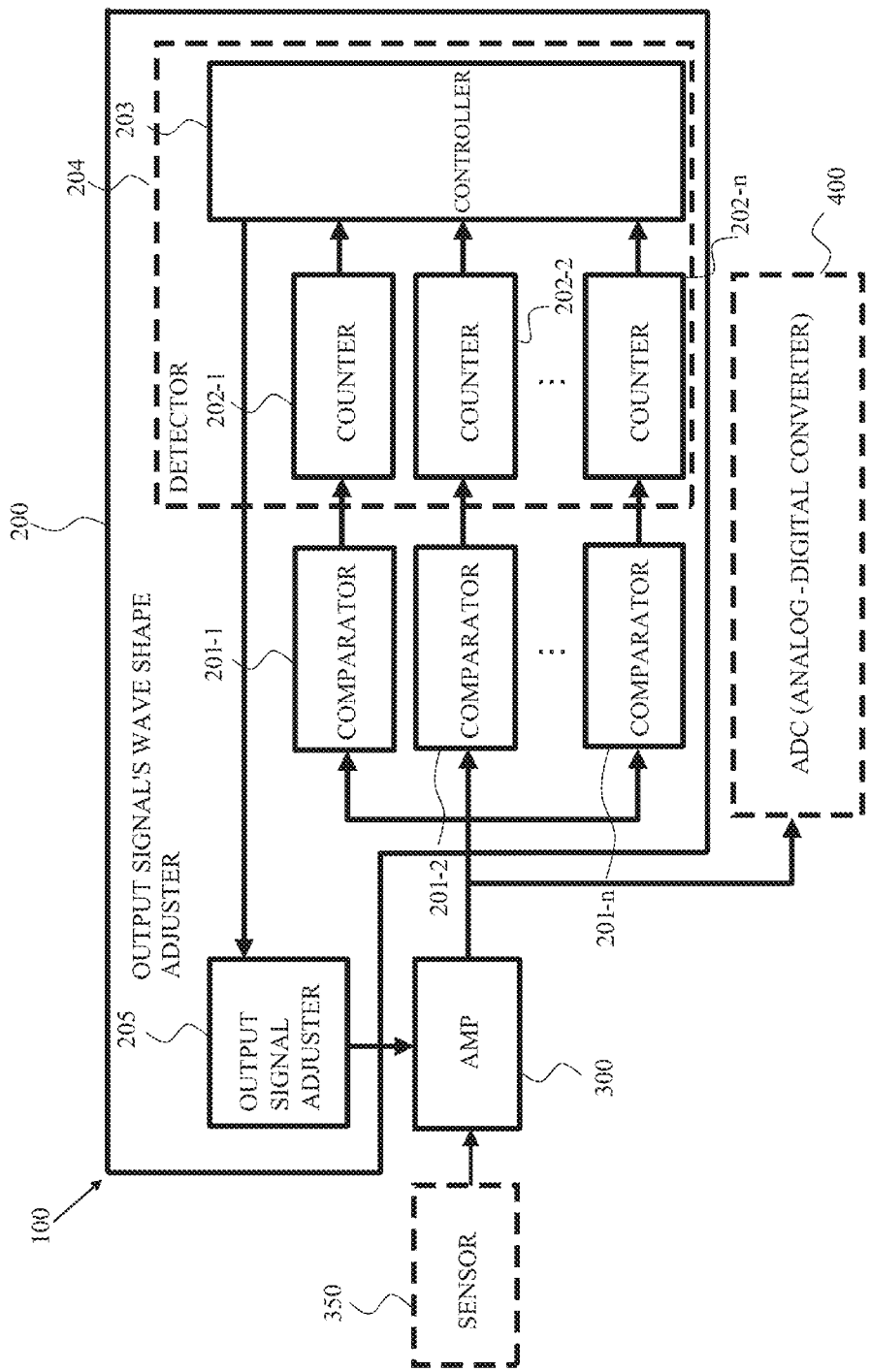
FIG. 2 A block diagram illustrated a configuration of the signal processing device according to an embodiment of the present invention.

Therefore, the configuration illustrated in FIG. 2 is added to a reader such as the bar-code reader.

A signal processing device 100 includes an output signal's wave shape adjusting device 200 and a variable amplifier 300. The output signal's wave shape adjusting device 200 includes comparators 201-1, 201-2, . . . 201-*n*, a detector 204 and an output signal adjuster 205. The detector 204 comprises counters 202-1, 202-2, . . . 202-*n* and a controller 203.

The number n of the comparators 201-1 . . . 201-*n* and the counters 202-1 . . . 202-*n* corresponds to the number of a plurality of thresholds set in an operating range, and each of the comparators 201-1 . . . 201-*n* and each of the counters 202-1 . . . 202-*n* correspond to each of the thresholds. The plurality of thresholds are reference values for detecting an amplitude of a wave shape or an offset location of an output signal, and it is desirable to divide the operating range at even intervals, but not necessarily limited to even intervals.

The comparators 201-1 . . . 201-*n* are connected to the variable amplifier 300. The output signal from the variable amplifier is supplied to the comparators 201-1 . . . 201-*n*, and the comparators 201-1 . . . 201-*n* compare magnitude relationship between the output signal and the corresponding thresholds and output the comparison result to each of the counters 202-1 . . . 202-*n* to which each of the comparators.

Each of the counters 202-1 . . . 202-*n* is connected to each of the comparators 201-1 . . . 201-*n* to which each of the counters 202-1 . . . 202-*n* corresponds. The counters 202-1 . . . 202-*n* count the number of intersections of the output signal and the thresholds per each threshold, the number of rise at the intersection, or the number of descent at the intersection on the basis of the comparison result supplied from each of comparators 201-1 . . . 201-*n* to which each of counters 202-1 . . . 202-*n* corresponds, and supply the count values to the controller 203. Namely, the count value per the threshold is supplied to the controller 203 with respect to all the thresholds.

The controller 203 is connected to each of the counters 202-1 . . . 202-*n*. The controller 203 calculates either or both of a gain adjusting amount and an offset adjusting amount of the valuable gain amplifier 300 on the basis of the count numbers supplied from each of the counters 202-1 . . . 202-*n* and supplies a signal indicating those adjusting amounts to the output signal adjuster 205.

The output signal adjuster 205 is connected to the controller 203. The output signal adjuster 205 receives the signal supplied from the controller 203 and adjusts either or both of the gain and the offset of the variable amplifier 300 on the basis of the received signal.

{Explanation of Operations}

We explain a case where the variable amplifier 300 treats a power voltage as an output signal, the power voltage ranges from 0 V to 3V, the thresholds are 0.5V, 1.0V, 1.5V, 2.0V and 2.5V, both of the number of comparators 201 and the number of counters 202 are 5, and the amplitude of the output signal's wave shape is small and the offset of the output signal's wave shape departs beneath. However, the embodiments of the present invention are not limited to this example. Further, with respect to a case where the amplitude of the output wave shape is large and a case where the offset of the output wave shape departs above, it is possible to make the amplitude and the offset of the output voltage of the variable amplifier 300 into target values respectively by operations similar to operations as explained below.

Figure 3:
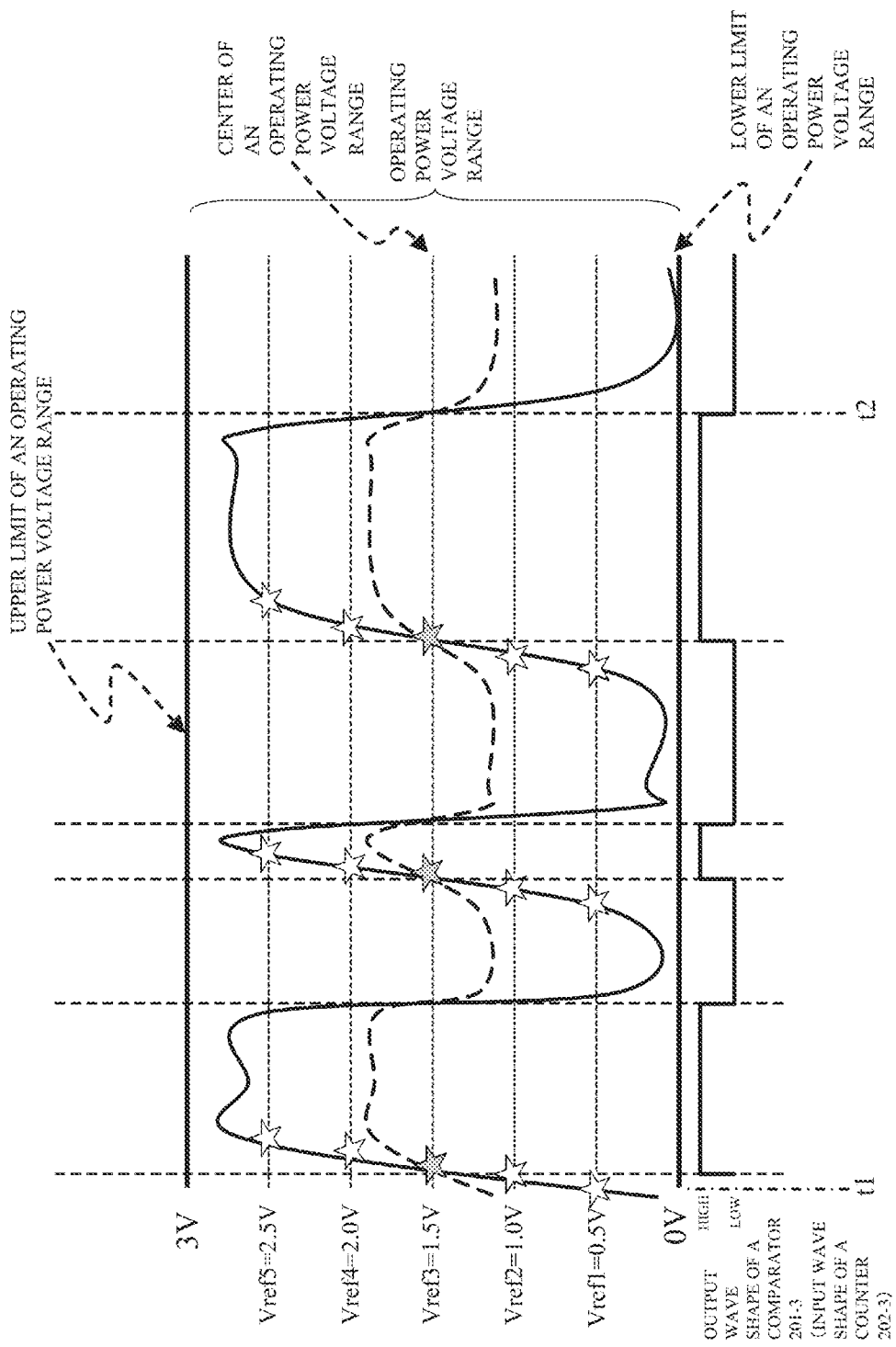
FIG. 3 A figure illustrates a method of gain adjustment applied to an output wave shape from a sensor according to the embodiment of the present invention.

A continuous line in FIG. 3 represents a power voltage's wave shape after being adjusted with respect to a gain of the (power voltage's) wave shape by a gain adjusting function in the present embodiment. A broken line in FIG. 3 represents a power voltage's wave shape before being adjusted with respect to the gain in a case where the amplitude of power voltage's wave shape output from the variable amplifier 300 is small.

Figure 4:
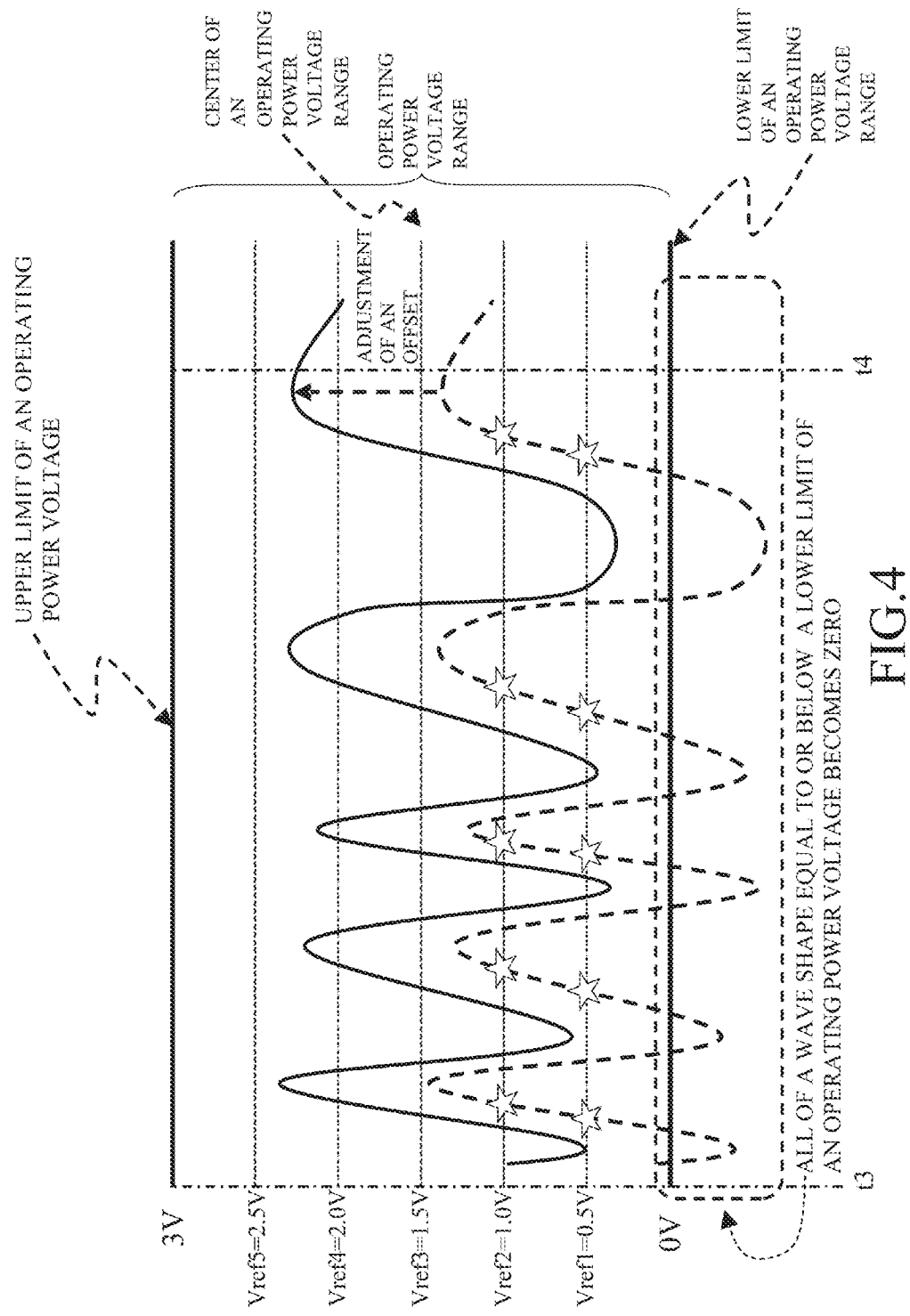
FIG. 4 A figure illustrates a method of offset adjustment applied to the output wave shape from the sensor according to the embodiment of the present invention.

Further, a continuous line in FIG. 4 represents a power voltage's wave shape after being adjusted with respect to an offset of the (power voltage's) wave shape by the offset adjusting function in the present embodiment. A broken line in FIG. 4 represents a power voltage's wave shape before being adjusted in a case where the offset of the power voltage's wave shape output from the variable amplifier 300 departs toward a lower limit direction.

Several threshold power voltages (Vref1 to Vref5 in examples in FIGS. 3 and 4) are determined within an operating power voltage range in FIGS. 3 and 4, and each of the threshold power voltages and the power voltage's wave shape output from the variable amplifier 300 are supplied to the comparators 201-1, 201-2, . . . , 201-$n$ (herein, n=5). The comparators 201-$i$ (i=1, 2, . . . , n (herein, n=5)) compare the threshold power voltage Vref (i) (i=1, 2, . . . , n (herein, n=5)) and the power voltage Vout (t) supplied from the variable amplifier 300. If the power voltage Vout (t) is larger than the threshold power voltage Vref (i), an output signal of the comparator 201-$i$ is in HIGH level. If the threshold power voltage Vref (i) is larger than the power voltage Vout (t) supplied from the variable amplifier 300, the output signal of the comparator 201-$i$ is in LOW level. The counters 202-1, 202-2, . . . , 202-$n$ (herein, n=5) count up, on the basis of wave shapes supplied from the comparators 201-1, . . . , 201-5 respectively, both when the wave shape supplied from each of the comparators 201-1, . . . , 201-5 rises from LOW to HIGH and when the wave shape supplied from each of the comparators 201-1, . . . , 201-5 descends from HIGH to LOW. This is realized in such a way that a gate detects both of a rise and a descent of the output signal of the comparator 201 and an asynchronous counter as the counter 202 counts the rise and the descent. Meanwhile, the counters 202-1, 202-2, . . . , 202-5 may count up, on the basis of wave shapes supplied from the comparators 201-1, 201-2, . . . , 201-5 respectively, only when the wave shape output from each of the comparators 201-1, 201-2, . . . , 201-5 rises from LOW to HIGH. This is realized in such a way that a gate detects only a rise of the output signal of the comparator 201 and an asynchronous counter as the counter 202 counts the rise. Further, the counters 202-1, 202-2, . . . , 202-5 may count up, on the basis of wave shapes output from the comparators 201-1, 201-2, . . . , 201-5 respectively, only when the wave shape supplied from each of the comparators 201-1, 201-2, . . . , 201-5 descends from HIGH to LOW. This is realized in such a way that a gate detects only a descent of the output signal of the comparator 201 and an asynchronous counter as the counter 202 counts the descent. In the present invention, "commonly select the number of times" means, for example, counting up both when a wave shape rises from LOW to HIGH and when a wave shape descends from HIGH to LOW with respect to all of thresholds, counting up only when a wave shape rises from LOW to HIGH with respect to all of thresholds, and counting up only when a wave shape descends from HIGH to LOW with respect to all of thresholds.

An ideal design wave shape is a wave shape whose center power voltage matches with a center of an operating power voltage range (1.5V in the examples in FIGS. 3 and 4) and an upper peak and a lower peak reach close to an upper limit and a lower limit of the operating power voltage range, respectively. In a case where the variable amplifier 300 outputs the ideal wave shape, all of the count numbers of the counters 202-1, 202-2, . . . , 202-5 become the same.

We explain a case where the amplitude of the power voltage's wave shape output from the variable amplifier 300 is small with reference to FIG. 3 as an example. Within a range from the time t1 to the time t2 in FIG. 3, there are three intersections of Vref 3 (=1.5V) which is the center of the operating power voltage and the wave shape (the broken line in FIG. 3) output from the variable amplifier 300, and therefore, the count number of the counter 202-3 corresponding to the threshold 1.5V is "3". However, this output power voltage is always over 1V and below 2V. Therefore, both of the count number of the counter 202-2 corresponding to the threshold 1V and the count number of the counter 202-4 corresponding to the threshold 2V are "0". Similarly, both of the count number of the counter 202-1 corresponding to the threshold 0.5V and the count number of the counter 202-5 corresponding to the threshold 2.5V are "0". In this case, the controller 203 determines that the wave shape output from the variable amplifier 300 is a wave shape whose center is Vref3 (=1.5V) and a one-side amplitude is below 0.5V and sends a control signal to the output signal adjuster 204 in such a way that the one-side amplitude will become equal to or more than 1.5V, namely the gain of the variable amplifier 300 will become three times as large as the present state. Further, the output signal adjuster 204 makes adjustment in such a way that the gain of the variable amplifier 300 will becomes three times as large as the present state. Therefore, in a scan subsequent to the feedback, the output wave shape from the variable amplifier 300 becomes a wave shape illustrated with the continuous line in FIG. 3.

However, for example, in a case where the amplitude of the wave shape output from the variable amplifier 300 is equal to 0.1V, even if above feedback is executed so that the gain of the variable amplifier 300 becomes three times larger, the count numbers of the counter 202-2 and the counter 202-4 remains "0". Therefore, the same process, namely the feedback, is repeated a number of times in the case.

Meanwhile, in a case where there is not a bar-code, the wave shape output from the variable amplifier 300 does not exist, and therefore, even if above feedback is performed any times, the count numbers of the counter 202-2 and the counter 202-4 remains "0", and infinity times feedbacks are repeated. Therefore, taking this point into consideration, it is necessary to determine an upper limit of the number of the feedbacks in advance.

Accordingly, the feedback for increasing the gain of the variable amplifier 300 is repeated until either one of the following conditions is met; the condition that all the count values of the counters 202-1 . . . 202-$n$ become the same and the condition that the number of the executed feedbacks reaches a predetermined number.

Further, a gain adjusting amount per one feedback is properly selected. For example, the gain after the feedback may be set larger than a gain before the feedback by several percent to several dozen percent and, if necessary, the number of feedbacks may be increased.

We explain a case where an offset of the power voltage's wave shape departs from a center of the operating power voltage range with reference to FIG. 4 as an example. In a case where the power voltage's wave shape output from the variable amplifier 300 is as indicated with the broken line as shown in FIG. 4, the count number of each counter is as follows. That is, "5" for the counter 202-1, "5" for the counter 202-2, "0" for the counter 202-3, "0" for the counter 202-4, and "0" for the counter 202-5 in a period between time t3 and time t4. Because the power voltage's wave shape output from the variable amplifier 300 intersects only with the threshold power voltages Vref1 and Vref2, the controller 203 determines that the power voltage's wave shape has an amplitude whose center is the power voltage below the threshold power voltage Vref3 being the center of the operating power voltage range and sends a control signal to the output signal adjuster 204 in such a way that 1V is added to the offset toward the upper limit direction. Further, the output signal adjuster 204 supplies a control signal to the variable amplifier 200 for adding 1V to the output offset power voltage toward the upper limit direction. Consequently, in a scan subsequent to the feedback performed, the output wave shape from the variable amplifier 300 becomes a wave shape indicated with the continuous line in FIG. 4. Here, it is supposed that the variable amplifier 300 has an offset adjusting function.

As indicated with the broken line in FIG. 4, with respect to a portion equal to or below 0V, it cannot be determined what wave shape the portion has before the offset change, and therefore, a similar judgment as above is further performed after the feedback. In a case where a center power voltage of the output power voltage's wave shape of the variable amplifier 300 after the feedback is not the center power voltage (1.5V) of the operating power voltage range, furthermore the offset is adjusted.

An offset adjustment is performed in such a way that the center power voltage of the output power voltage's wave shape of the variable amplifier 300 becomes the center power voltage (1.5V). For example, the offset adjustment is performed (1) in such a way that the count value corresponding to the threshold value Vref3 becomes a predetermined value and count values corresponding to all of other threshold values respectively become zero, (2) in such a way that the count values corresponding to the threshold values Vref2, Vref3 and Vref4 respectively become predetermined values and other count values corresponding to all of other threshold values respectively become zero, (3), or in such a way that the count values corresponding to the threshold values Vref1, Vref2, Vref3, Vref4 and Vref5 respectively become predetermined values.

Meanwhile, in a case where there is not a bar-code, the wave shape output from the variable amplifier 300 does not exist, and therefore, none of above conditions (1) to (3) are satisfied even if the above feedback is performed any times. Thus, infinity times the feedback is repeated. Therefore, taking this point into consideration, it is necessary to determine an upper limit of the number of the feedbacks in advance.

Namely, the feedback is repeated until either one of the following conditions is met; the above conditions (1) to (3) and a condition that the number of the executed feedbacks reaches a predetermined number.

Further, the offset adjusting amount per one feedback is properly selected. For example, an absolute value between an offset amount after the feedback and an offset amount before the feedback may be approximately 0.1V and, if necessary, the number of feedbacks may be increased. Here, an adjustment direction of the offset is determined on the basis of the count values corresponding to the threshold values respectively. For example, if count values corresponding to lower thresholds are the same as the predetermined value and count values corresponding to upper thresholds are zero, the offset is adjusted toward the upper direction. If count values corresponding to upper thresholds are the same as the predetermined value and count values corresponding to lower thresholds are zero, the offset is adjusted toward the lower direction.

Typically, the gain adjustment is performed after the offset adjustment. Namely, the offset adjustment is performed in such a way that either one of above conditions (1) to (3) is satisfied, then the gain adjustment is performed in such a way that above condition (3) is satisfied.

Meanwhile, in a case where the amplitude of the output of the variable amplifier 300 is overlarge, the count values corresponding to all of the counters respectively are equal to each other, and it is judged that the output is normal. In this case, in some cases, the decoding of the bar-code is possible in some cases, and the decoding of the bar-code is impossible in other cases. Practically, if the amplitude of output of the variable amplifier 300 is overlarge, so that the decoding of the bar-code is impossible, and it is necessary to control for making the output amplitude of the variable amplifier 300 be a predetermined amplitude, then a comparator 201 and a counter 202 which correspond to a threshold between 0V and the Vref1 are added, and furthermore, a comparator 201 and a counter 202 which correspond to a threshold between Vref5 and 3V are added, and a control is performed so that count values corresponding to the added counters become zero. Namely, the control can be performed in such a way that all of count values corresponding to the thresholds Vref1, Vref2, Vref3, Vref4 and Vref5 respectively become the predetermined values and both of count values corresponding to the thresholds added here become zero.

First Embodiment

Figure 5:
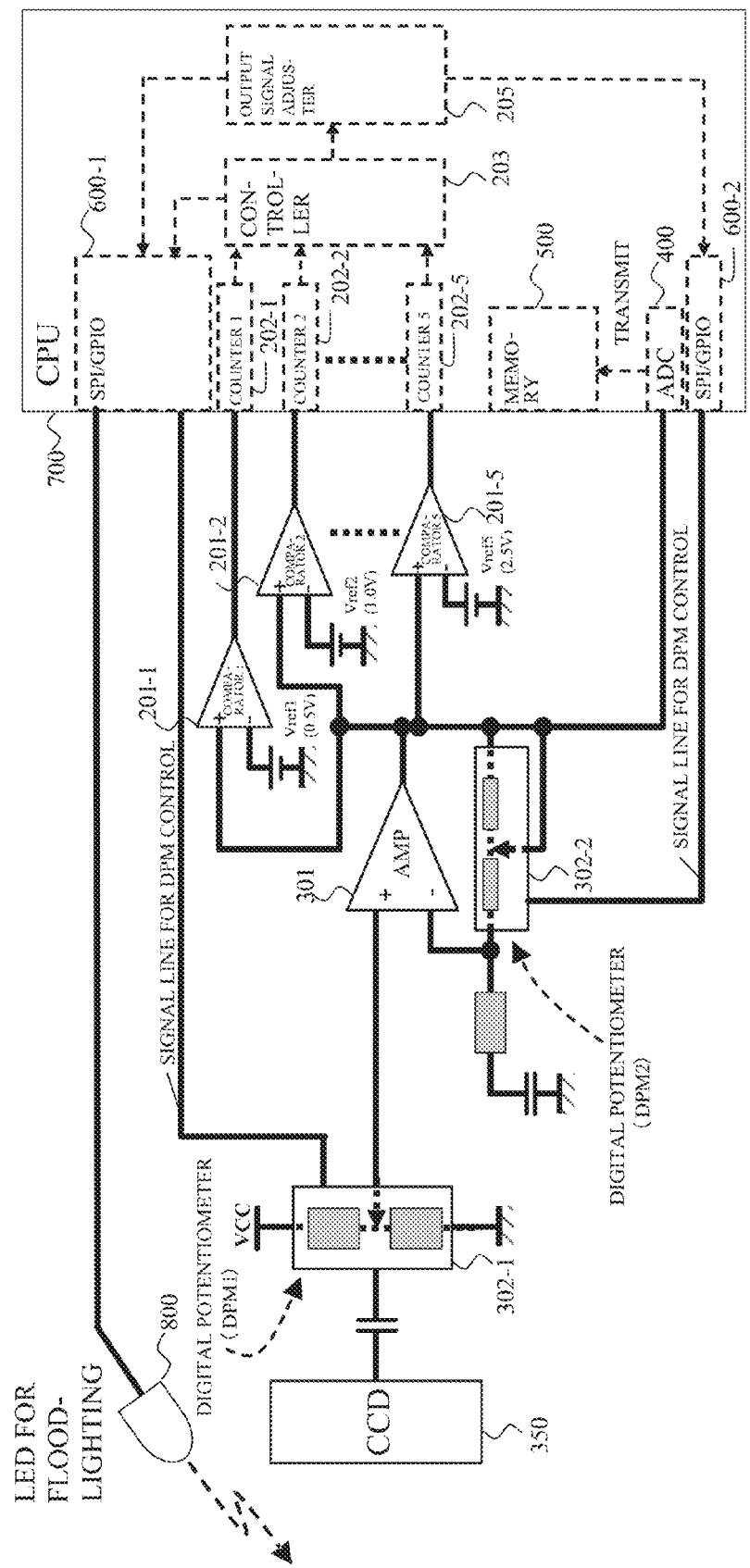
FIG. 5 A figure illustrates a configuration of a bar-code reader according to the embodiment of the present invention.

The first embodiment of the present invention is illustrated in FIG. 5. Here, the first comparator 201-1, the second comparator 201-2, . . . , and the fifth comparator 201-5 are used as five comparators 201-1, 201-2, . . . , and 201-5 corresponding to five thresholds respectively. Further, a CPU 200 is used as the output signal wave shape adjusting device 200.

Further, the variable amplifier 300 has the offset adjusting function and the gain adjusting function as noted above. The offset adjustment is achieved by the CPU 200 adjusting a resistance value of a digital potentiometer 302-1 and thereby adjusting a center power voltage of a non-inverted input terminal of an operational amplifier 301. The gain adjustment is achieved by the CPU 200 adjusting a resistance value of a digital potentiometer 302-2 and thereby adjusting a resistance value between an inverted input terminal and an output terminal of an operational amplifier 301.

The counters 202-1, 202-2, . . . , 202-5, the controller 203 and the output signal adjuster 204 in FIG. 2 are built into the CPU 200. Here, the counters 202-1, 202-2, . . . , and 202-5 are achieved by the CPU 200 reading and executing a program. Meanwhile, not only functions of the counters 202-1, 202-2, . . . , 202-5 but also functions of the controller 203 and the output signal adjuster 204 are achieved by the CPU 200 reading and executing a program.

Two digital potentiometers 302-1 and 302-2 illustrated in FIG. 5 are some type of variable resistor and ICs, a wiper of which can be controlled by digital signals (such as interface signals, for example, SPI).

Several threshold power voltages are set within the operating power voltage range. In the example illustrated in FIG. 5, the threshold power voltages Vref1 to Vref5 by 0.5V are set within the operating range. The first comparator 201-1 to the fifth comparator 201-5 are devices for comparing threshold power voltages Vref1 to Vref5 and the output power voltage of the variable amplifier 300 and representing the comparing results by, for example, levels (a LOW level and a HIGH level) which are output from the comparators and can be discerned by the CPU 700. As noted above, the counters 202-1 to 202-5 count either of the number of times that an output level of the comparators 201-1 to 201-5 corresponding to the counters 202-1 to 202-5 respectively change from a LOW level to a HIGH level in a predetermined period and the number of times that the output level of the comparators 201-1 to 201-5 corresponding to the counters 202-1 to 202-5 respectively change from the HIGH level to the LOW level, or a sum of both of the numbers of times. Meanwhile, as noted above, the counters may be achieved by the CPU 700 reading and executing a program, or may be achieved by hardware built into the CPU 700.

Figure 6:
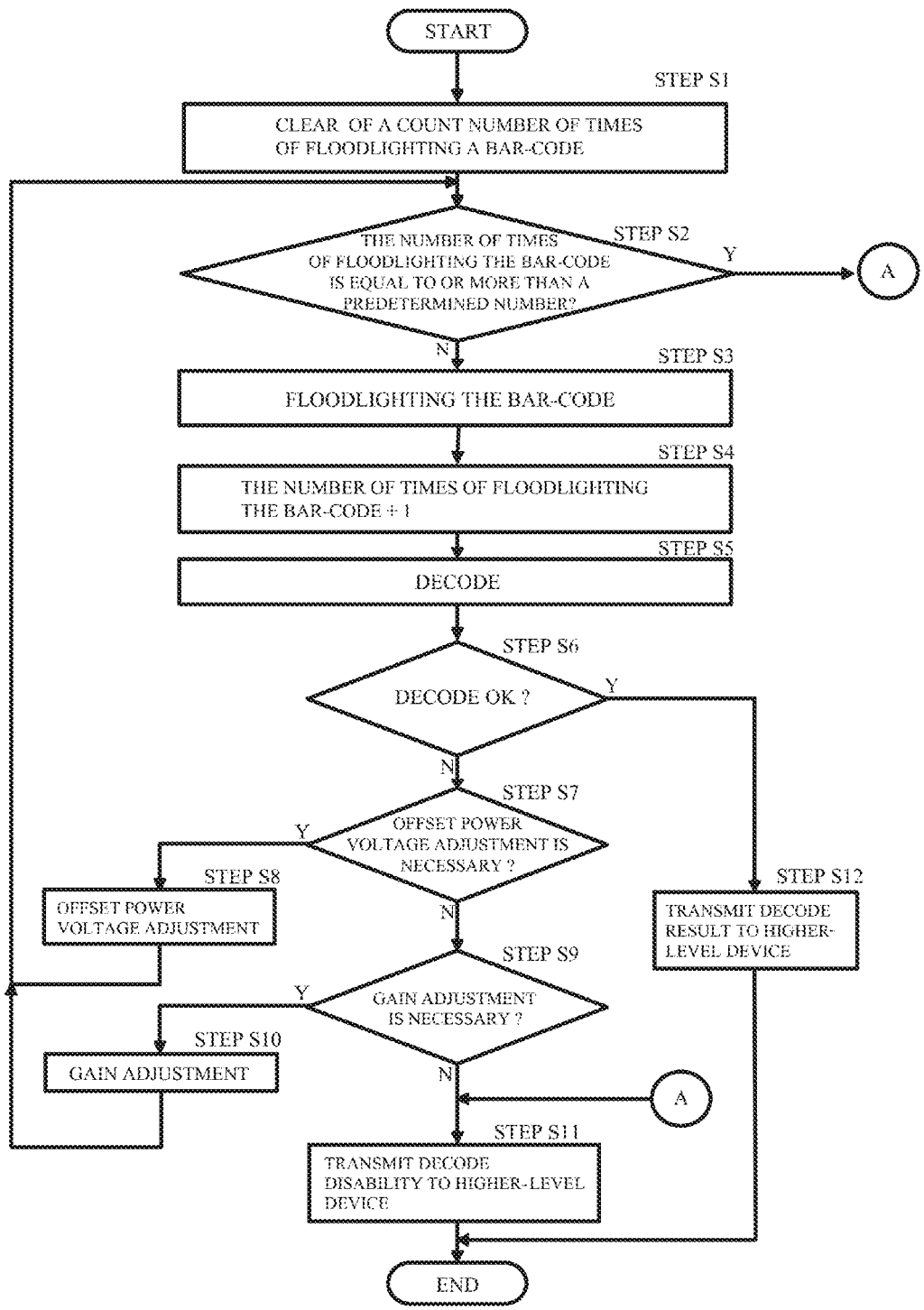
FIG. 6 A flow chart illustrates a flow of operations of the bar-code reader according to the embodiment of the present invention.

The operations of the signal processing device shown in the first embodiment is explained referring to FIG. 6.

1) Firstly, the controller 203 clears a count of the number of times of floodlighting a bar-code (Step S1).

2) Then, in a case where the number of times of floodlighting the bar-code is equal to or more than a predetermined number (Y in Step S2), via A, the controller 203 transmits decode disability to a higher-level device (Step S11), and the flow terminates. In a case where the number of times of floodlighting on the bar-code is less than the predetermined number (N in Step S3), the flow moves to Step S3.

3) Then, a floodlighting LED 800 floodlights the bar-code (Step S3).

4) Then, the controller 203 adds 1 to the number of times of floodlighting the bar-code (Step S4).

5) Then, a CCD 350 receives reflected light from the bar-code and the CPU 700 decodes the bar-code (Step S5). Meanwhile, the flow from the time when the CCD 350 receives the reflected light from the bar-code to the time when the CPU 700 decodes is omitted because of conventional technology.

6) In a case where the decoding is possible (Y in Step S6), the CPU 700 transmits the decode result to the higher-level device (Step S12), and the flow terminates. In a case where the decoding is impossible (N in Step S6), the flow moves to Step S7.

7) In Step S7, the controller 203 judges whether or not the offset power voltage adjustment is necessary. In a case where the offset power voltage adjustment is necessary (Y in Step S7), the output signal adjuster 205 adjusts the offset power voltage (Step S8), and the flow returns to Step S2. In a case where the offset power voltage adjustment is not necessary (N in Step S7), the flow moves to Step S9. The judgment of whether or not the offset power voltage adjustment is necessary and details of the offset power voltage adjustment are explained below.

8) In Step S9, the controller 203 judges whether or not the gain adjustment is necessary. In a case where the gain adjustment is necessary (Y in Step S9), the output signal adjuster 205 adjusts the gain (Step S10), and the flow returns to Step S2. In a case where the gain adjustment is not necessary (N in Step S9), the CPU 700 transmits decode disability to the higher-level device (Step S11), and the flow terminates. The judgment of whether or not the gain adjustment is necessary and details of the gain adjustment are explained below.

In above operation procedures, the order of the judgment of whether or not the offset power voltage adjustment is necessary and the offset power voltage adjustment, and the judgment of whether or not the gain adjustment is necessary and the gain adjustment may be reversed.

The judgment of whether or not the offset power voltage adjustment is necessary and the offset power voltage adjustment, and the judgment of whether or not the gain adjustment is necessary and the gain adjustment are performed as follows.

An operating power voltage upper limit of the CCD 350 is set at Vmax. An operating power voltage lower limit of the CCD 350 is set at Vmin. A reference power voltage value Vref1 of the comparator 201-1 is set at (Vmax−Vmin)/2−(Vmax−Vmin)/3. A reference power voltage value Vref2 of the comparator 201-2 is set at (Vmax−Vmin)/2−(Vmax−Vmin)/6. A reference power voltage value Vref3 of the comparator 201-3 is set at (Vmax−Vmin)/2. A reference power voltage value Vref4 of the comparator 201-4 is set at (Vmax−Vmin)/2+(Vmax−Vmin)/6. A reference power voltage value Vref5 of the comparator 201-5 is set at (Vmax−Vmin)/2+(Vmax−Vmin)/3. Further, a count number of the counter 202-1 corresponding to the comparator 201-1 is assumed to be represented by CP1, a count number of the counter 202-2 corresponding to the comparator 201-2 is assumed to be represented by CP2, a count number of the counter 202-3 corresponding to the comparator 201-3 is assumed to be represented by CP3, a count number of the counter 202-4 corresponding to the comparator 201-4 is assumed to be represented by CP4, a count number of the counter 202-5 corresponding to the comparator 201-5 is assumed to be represented by CP5.

The judgment of whether or not the offset power voltage adjustment is necessary and the offset power voltage adjustment itself are processed on case-by-case basis as follows.

(i-1) In a case of CP1=0, CP2=0, CP3=0, CP4=0 and CP5≠0, the controller 203 determines that the output signal's wave shape exists only within a range over Vref4, therefore the offset is out of alignment to an upper side by (Vref5−Vmin)/2 than a desired value 1.5V and sets the offset power voltage at (current value)−(Vref5−Vmin)/2.

(i-2) In a case of CP1=0, CP2=0, CP3=0, CP4≠0 and CP5≠0, the controller 203 determines that the output signal's wave shape exists only within a range over Vref3, therefore the offset is out of alignment to the upper side by (Vref4−Vmin)/2 than the desired value 1.5V and sets the offset power voltage at (current value)−(Vref4−Vmin)/2.

(i-3) In a case of CP1=0, CP2=0, CP3≠0, CP4≠0 and CP5≠0, the controller 203 determines that the output signal's wave shape exists only within a range over Vref2, therefore the offset is out of alignment to the upper side by (Vref3−Vmin)/2 than the desired value 1.5V and sets the offset power voltage at (current value)−(Vref3−Vmin)/2.

(i-4) In a case of CP1≠0, CP2=0, CP3=0, CP4=0 and CP5=0, the controller 203 determines that the output signal's wave shape exists only within a range below Vref2, therefore the offset is out of alignment to a lower side by (Vmax−Vref1)/2 than the desired value 1.5V and sets the offset power voltage at (current value)+(Vmax−Vref1)/2.

(i-5) In a case of CP1≠0, CP2≠0, CP3=0, CP4=0 and CP5=0, the controller 203 determines that the output signal's wave shape exists only within a range below Vref3, therefore the offset is out of alignment to the lower side by (Vmax−Vref2)/2 than the desired value 1.5V and sets the offset power voltage at (current value)+(Vmax−Vref2)/2.

(i-6) In a case of CP1≠0, CP2≠0, CP3≠0, CP4=0 and CP5=0, the controller 203 determines that the output signal's wave shape exists only within a range below Vref4, therefore the offset is out of alignment to the lower side by (Vmax−Vref3)/2 than the desired value 1.5V and sets the offset power voltage at (current value)+(Vmax−Vref3)/2.

(i-7) In a case other than above (i-1) to (i-6), the controller 203 determines that the offset power voltage adjustment is not necessary.

The judgment of whether or not the gain adjustment is necessary and the gain adjustment itself are processed on case-by-case basis as follows.

(ii-1) In a case of CP1=0, CP2=0, CP3≠0, CP4=0 and CP5=0, the controller 203 determines that the output signal's wave shape exists only within a range over Vref2 and below Vref4, therefore the gain is ⅓ times as large as a desired value and sets the gain at (current value)×3.

(ii-2) In a case of CP1=0, CP2≠0, CP3≠0, CP4=0 and CP5=0, the controller 203 determines that the output signal's wave shape exists only within a range over Vref1 and below Vref4, therefore the gain is 1.5/2.5 times as large as the desired value and sets the gain at (current value)×2.5/1.5.

(ii-3) In a case of CP1=0, CP2=0, CP3≠0, CP4≠0 and CP5=0, the controller 203 determines that the output signal's wave shape exists only within a range over Vref2 and below Vref5, therefore the gain is 1.5/2.5 times as large as the desired value and sets the gain at (current value)×2.5/1.5.

(ii-4) In a case of CP1=0, CP2=0, CP3=0, CP4≠0 and CP5=0, the controller 203 determines that the output signal's wave shape exists only within a range over Vref3 and below Vref5, therefore the gain is ½ times as large as the desired value and sets the gain at (current value)×2.

(ii-5) In a case of CP1=0, CP2≠0, CP3=0, CP4=0 and CP5=0, the controller 203 determines that the output signal's wave shape exists only within a range over Vref1 and below Vref3, therefore the gain is ½ times as large as the desired value and sets the gain at (current value)×2.

(ii-6) In a case other than above (ii-1) to (ii-5), the controller determines that the gain adjustment is not necessary.

Meanwhile, one or more of the count numbers of CP1 to CP5 are deemed as 0 in a case that the one or more of the count numbers are equal to or lower than a predetermined number (for example, the number of approximately 10% of the maximum of the count number of each counter acquired from reflected light from the bar-code).

Second Embodiment

A second embodiment of the present invention is similar to the first embodiment illustrated in FIG. 5. However, in the second embodiment, the center threshold, the comparator 201-3 and the counter 202-3 corresponding to the center threshold respectively do not exist, and the comparator 201-1, the comparator 201-2, the comparator 201-4 and the comparator 201-5 are used as four comparators corresponding to four thresholds respectively. Further, the CPU 200 is used as the signal processing device 200.

Further, the counter 202-1, 202-2, 202-4 and 202-5, the controller 203 and the output signal adjuster 204 in FIG. 2 are built into the CPU 200. Here, the counters 202-1, 202-2, 202-4 and 202-5 are achieved by the CPU 200 reading and executing a program. Meanwhile, not only functions of the counters 202-1, 202-2, 202-4 and 202-5 but also functions of the controller 203 and the output signal adjuster 204 are achieved by the CPU 200 reading and executing a program.

The signal processing device disclosed in the second embodiment operates along the flowchart illustrated in FIG. 6 just like the first embodiment.

The judgment of whether or not the offset power voltage adjustment is necessary, the offset power voltage adjustment itself, the judgment of whether or not the gain adjustment is necessary, and the gain adjustment of a bar-code reader itself in the second embodiment are performed as follows contrary to the barcode reader in the first embodiment.

An operating power voltage upper limit of a CCD 350 is set at Vmax. An operating power voltage lower limit of the CCD 350 is set at Vmin. A reference power voltage value Vref1 of the comparator 201-1 is set at (Vmax−Vmin)/2−(Vmax−Vmin)/3. A reference power voltage value Vref2 of the comparator 201-2 is set at (Vmax−Vmin)/2−(Vmax−Vmin)/6. A center value V3 is set at (Vmax−Vmin)/2. A reference power voltage value Vref4 of the comparator 201-4 is set at (Vmax−Vmin)/2+(Vmax−Vmin)/6. A reference power voltage value Vref5 of the comparator 201-5 is set at (Vmax−Vmin)/2+(Vmax−Vmin)/3. Further, a count number of the comparator 201-1 is assumed to be represented by CP1, a count number of the comparator 201-2 is assumed to be represented by CP2, a count number of the comparator 201-4 is assumed to be represented by CP4, a count number of the comparator 201-5 is assumed to be represented by CP5.

The judgment of whether or not the offset power voltage adjustment is necessary and the offset power voltage adjustment itself are processed on case-by-case basis as follows.

(i-1) In a case of CP1=0, CP2=0, CP4=0 and CP5≠0, the controller 203 determines that the output signal's wave shape exists only within a range over Vref4, therefore the offset is out of alignment to an upper side by (Vref5−Vmin)/2 than a desired value 1.5V and sets the offset power voltage at (current value)−(Vref5−Vmin)/2.

(i-2) In a case of CP1=0, CP2=0, CP4≠0 and CP5≠0, the controller 203 determines that the output signal's wave shape exists only within a range over Vref2, therefore the offset is out of alignment to the upper side by (Vref3−Vmin)/2 than the desired value 1.5V and sets the offset power voltage at (current value)−(Vref3−Vmin)/2.

(i-3) In a case of CP1≠0, CP2=0, CP4=0 and CP5=0, the controller 203 determines that the output signal's wave shape exists only within a range below Vref2, therefore the offset is out of alignment to a lower side by (Vmax−Vref1)/2 than the desired value 1.5V and sets the offset power voltage at (current value)+(Vmax−Vref1)/2.

(i-4) In a case of CP1≠0, CP2≠0, CP4=0 and CP5=0, the controller 203 determines that the output signal's wave shape exists only within a range below Vref4, therefore the offset is out of alignment to the lower side by (Vmax−Vref3)/2 than the desired value 1.5V and sets the offset power voltage at (current value)+(Vmax−Vref3)/2.

(i-5) In a case other than above (i-1) to (i-4), the controller 203 determines that the offset power voltage adjustment is not necessary.

The judgment of whether or not the gain adjustment is necessary and the gain adjustment itself are processed on case-by-case basis as follows.

(ii-1) In a case of CP1=0, CP2=0, CP4≠0 and CP5=0, the controller 203 determines that the output signal's wave shape exists only within a range over Vref2 and below Vref5, therefore the gain is ½ times as large as a desired value and sets the gain at (current value)×2.

(ii-2) In a case of CP1=0, CP2≠0, CP4=0 and CP5=0, the controller 203 determines that the output signal's wave shape exists only within a range over Vref1 and below Vref4, therefore the gain is ½ times as large as the desired value and sets the gain at (current value)×2.

(ii-3) In a case other than above (ii-1) to (ii-2), the controller determines that the gain adjustment is not necessary.

Meanwhile, one or more of the count numbers of CP1, CP2, CP4 and CP5 are deemed as 0 in a case that the one or more of the count numbers are equal to or lower than a predetermined number (for example, the number of approximately 10% of the maximum of the count number of each counter acquired from reflected light from the bar-code).

In above first and second embodiments, Vref2 is set at the power voltage which is lower by (Vmax−Vmin)/6 than the center value of the CCD operating power voltage, and Vref4 is set at the power voltage which is higher by (Vmax−Vmin)/6 than the center value of the CCD operating power voltage. However, Vref2 and Vref4 may be set at power voltages which are around the power voltages in the first and second embodiments, respectively. Further, Vref1 is set at the power voltage which is lower by (Vmax−Vmin)/3 than the center value of the CCD operating power voltage, and Vref5 is set at the power voltage which is higher by (Vmax−Vmin)/3 than the center value of the CCD operating power voltage. However, Vref1 and Vref5 may be set at power voltages which are around the power voltages in the first and second embodiments, respectively.

Third Embodiment

Although the wave pulses output from the comparators are counted by using the counters built in the CPU in the first and second embodiments, the counters may be disposed outside of the CPU also.

Fourth Embodiment

Although the controller and the output signal adjuster are built in the CPU in the first to the third embodiments, the controller and the output signal adjuster may be disposed outside of the CPU. Namely, the controller can be realized without using software and only with hardware.

Fifth Embodiment

Although comparison with threshold power voltages is performed by using hardware-implemented comparators in the first to the fourth embodiments, the same process as those in the comparators can be performed by using software, because the power voltage value of the power voltage's wave shape output from the variable amplifier 300 is stored within the memory. Namely, the process in the hardware-implemented comparators can be realized by the CPU reading and executing a program. Specifically, comparison between the output power voltage from the variable amplifier 300 and the threshold power voltages can be executed by the CPU which reads the output power voltage of the variable amplifier 300 using an analog/digital convertor and compares a value representing the power voltage of the analog/digital converter with values representing the threshold power voltages.

Sixth Embodiment

Although the digital potentiometers are used for adjusting the gain and the offset in the first to the fifth embodiments, it is also possible to determine the feedback amount by using resistances and analog switches. For example, parts of a plurality of resistance elements which are included within a ladder resistor and connected to each other in series may be short-circuited with an analog switch. The means are not limited to digital potentiometers as long as the resistance value can be changed.

Seventh Embodiment

Although the first to the sixth embodiments disclose a case that the sensor is a CCD camera of the bar-code reader and the object of the sensor is a bar-code, it is also possible that the object of the sensor is a code within a magnetic stripe of a magnetic card and the sensor is a sensor of a magnetic card reader.

In the present invention, above noted configuration enables a decoding by adjusting a wave shape and storing the wave shape within a design range even when the output signal's wave shape from the sensor becomes out of design. Particularly, a conventional bar-code reader has a defect that, for example, in a case where an amplitude of a (power voltage) wave shape output from the CCD is small, a load on CPU increases when decode processing is performed with software because a value which has been converted into a power voltage value with an ADC once is stored in a memory. Further, in a case where noises superimpose at an output side of an amplifier (AMP1 in the example of FIG. 1), noises also increase with the (power voltage) wave shape output from the CCD when processed by software. However, as explained in the present embodiments, feedback applied to a wave shape output from the variable amplifier 300 has an advantage of reducing undesired effects from noises. Furthermore, in the present embodiments, in a case where binarization processing is achieved by an electric circuit as hardware, the minimum amplitude which can be binarized is determined with hardware, and therefore, the method for adjusting the amplitude of wave shape output from the sensor 350 provided by the present embodiment is particularly effective.

Meanwhile, each portion of the above-described signal processing device may be achieved by hardware, software, or combination thereof. Further, the signal processing method executed by the above-described signal processing device may be achieved by hardware, software, or combination thereof. Here, the expression "achieved by software" means "achieved by a computer reading and executing a program".

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

A part or entirety of the above-described embodiments may be described as in the following supplementary notes, but are not limited thereto.

(Supplementary Note 1)

A signal processing device comprising:
- a variable amplifier configured to output a signal, as an output signal thereof, corresponding to an input signal, an offset and a gain of the variable amplifier being able to be adjusted;
- a comparing means configured to compare a level of the output signal of the variable amplifier with a plurality of thresholds;
- a detecting means configured to detect either or both of a shift of the offset of the variable amplifier and an excess or deficiency of the gain of the variable amplifier based on the result of the comparison executed in the comparing means; and
- an adjusting means configured to adjust either or both of the offset and the gain of the variable amplifier based on the result of the detection executed in the detecting means.

{Supplementary Note 2}

The signal processing device according to Supplementary note 1, wherein the detecting means is also configured to utilize, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

{Supplementary Note 3}

The signal processing device according to Supplementary note 2, wherein the detecting means is also configured to detect either or both of the shift of the offset of the output signal and the excess or deficiency of the gain of the output signal based on a combination of the numbers of times as similarly selected among the plurality of thresholds.

{Supplementary Note 4}

The signal processing device according to Supplementary note 3, wherein the detecting means is also configured to detect an estimation of the shift of the offset of the output signal based on the combination of the number of times as similarly selected among the plurality of thresholds, and the adjusting means is also configured to determine an adjusting amount of the offset based on the estimation of the shift of the offset.

{Supplementary Note 5}

The signal processing device according to Supplementary note 3 or 4, wherein the detecting means is also configured to detect an estimation of the excess or deficiency of the gain of the output signal based on the combination of the numbers of times as similarly selected among the plurality of thresholds, and the adjusting means is also configured to determine an adjusting amount of the gain based on the estimation of the excess or deficiency of the gain.

{Supplementary Note 6}

A bar-code reader comprising:

a sensor;

the signal processing device according to any one of Supplementary notes 1 to 5; and a decoder, wherein the signal processing device is also configured to treat an output signal of the sensor as an input signal supplied to the signal processing device, and the decoder is configured to treat an output signal of the signal processing device as an input signal supplied to the decoder.

{Supplementary Note 7}

A signal processing method comprising:

a step in which, a variable amplifier outputs a signal, as an output signal thereof, corresponding to an input signal, an offset and a gain of the variable amplifier being able to be adjusted;

a step in which, a comparing means compares a level of the output signal of the variable amplifier with a plurality of thresholds;

a step in which, a detecting means detects either or both of a shift of the offset of the variable amplifier and an excess or deficiency of the gain of the variable amplifier based on the result of the comparison executed in the comparing means; and a step in which, an adjusting means adjusts either or both of the offset and the gain of the variable amplifier based on the result of the detection executed in the detecting means.

{Supplementary Note 8}

The signal processing method according to Supplementary note 7, wherein the detecting means utilizes, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

{Supplementary Note 9}

The signal processing method according to Supplementary note 8, wherein the detecting means detects either or both of the shift of the offset of the output signal and the excess or deficiency of the gain of the output signal based on a combination of the numbers of times as similarly selected among the plurality of thresholds.

{Supplementary Note 10}

The signal processing method according to Supplementary note 9, wherein the detecting means detects an estimation of the shift of the offset of the output signal based on the combination of the number of times as similarly selected among the plurality of thresholds, and the adjusting means determines an adjusting amount of the offset based on the estimation of the shift of the offset.

{Supplementary Note 11}

The signal processing method according to Supplementary note 9 or Supplementary note 10, wherein the detecting means detects an estimation of the excess or deficiency of the gain of the output signal based on the combination of the numbers of times as similarly selected among the plurality of thresholds, and the adjusting means determines an adjusting amount of the gain based on the estimation of the excess or deficiency of the gain.

{Supplementary Note 12}

A signal processing program for causing a computer to function as an output signal's wave shape adjusting device for adjusting an output signal from a variable amplifier configured to output a signal, as an output signal thereof, corresponding to an input signal, an offset and a gain of the variable amplifier being able to be adjusted, the program causing the computer to function as:

a comparing means configured to compare a level of the output signal of the variable amplifier with a plurality of thresholds;

a detecting means configured to detect either or both of a shift of the offset of the variable amplifier and an excess or deficiency of the gain of the variable amplifier based on the result of the comparison executed in the comparing means; and an adjusting means configured to adjust either or both of the offset and the gain of the variable amplifier based on the result of the detection executed in the detecting means.

{Supplementary Note 13}
The signal processing program according to Supplementary note 12, wherein
the detecting means is also configured to utilize, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

{Supplementary Note 14}
The signal processing program according to Supplementary note 13, wherein
the detecting means is also configured to detect either or both of the shift of the offset of the output signal and the excess or deficiency of the gain of the output signal based on a combination of the numbers of times as similarly selected among the plurality of thresholds.

{Supplementary Note 15}
The signal processing program according to Supplementary note 14, wherein
the detecting means is also configured to detect an estimation of the shift of the offset of the output signal based on the combination of the number of times as similarly selected for among the plurality of thresholds, and
the adjusting means is also configured to determine an adjusting amount of the offset based on the estimation of the shift of the offset.

{Supplementary Note 16}
The signal processing program according to Supplementary 14 or 15, wherein
the detecting means is also configured to detect an estimation of the excess or deficiency of the gain of the output signal based on the combination of the numbers of times as similarly selected among the plurality of thresholds, and
the adjusting means is also configured to determine an adjusting amount of the gain based on the estimation of the excess or deficiency of the gain.

The present application claims the priority based on Japanese Application No. 2012-145651 filed on Jun. 28, 2012, the disclosure of which is all incorporated herein.

INDUSTRIAL APPLICABILITY

The present invention is applicable to a device which outputs an analog signal continuously from the same data (such as the bar-code in the present invention) by using a sensor and so forth.

For example, application to a magnetic card reader can be considered. When a code within a magnetic stripe of a magnetic card is read, a magnetic head outputs an analog (power voltage) wave shape. In a case where the read magnetic card is a demagnetized card (a card whose magnetic force becomes less powerful because of aged deterioration or because a magnet is moved close to a stripe portion of the magnetic card), a gain of reproduced signal becomes smaller, and therefore, it's contemplated that the gain amplification according to the method shown in the present invention operates effectively.

REFERENCE SINGS LIST

100: Signal processing device
200: Output signal's wave shape adjusting device
201-1: Comparator
201-2: Comparator
201-$n$: Comparator
202-1: Counter
202-2: Counter
202-$n$: Counter
203: Controller
204: Detector
205: Output signal adjuster
300: Variable amplifier
301: Operational amplifier
302-1: Digital potentiometer
302-2: Digital potentiometer
350: Sensor
400: ADC (Analog-digital convertor)
500: Memory
600-1: SPI/GPIO
600-2: SPI/GPIO
700: CPU
800: LED for floodlighting

What is claimed is:

1. A signal processing device comprising:
a variable amplifier configured to output a signal, as an output signal thereof, corresponding to an input signal, an offset and a gain of the variable amplifier being able to be adjusted;
a comparing means configured to compare a level of the output signal of the variable amplifier with a plurality of thresholds;
a detecting means configured to detect either or both of a shift of the offset of the variable amplifier and an excess or deficiency of the gain of the variable amplifier based on the result of the comparison executed in the comparing means; and
an adjusting means configured to adjust either or both of the offset and the gain of the variable amplifier based on the result of the detection executed in the detecting means, wherein
the detecting means is also configured to utilize, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

2. The signal processing device according to claim 1, wherein
the detecting means is also configured to detect either or both of the shift of the offset of the output signal and the excess or deficiency of the gain of the output signal based on a combination of the numbers of times as similarly selected among the plurality of thresholds.

3. The signal processing device according to claim 2, wherein
the detecting means is also configured to detect an estimation of the shift of the offset of the output signal based on the combination of the number of times as similarly selected among the plurality of thresholds, and the adjusting means is also configured to determine an adjusting amount of the offset based on the estimation of the shift of the offset.

4. The signal processing device according to claim 2, wherein the detecting means is also configured to detect an estimation of the excess or deficiency of the gain of the output signal based on the combination of the numbers of times as similarly selected among the plurality of thresholds, and the adjusting means is also configured to determine an adjusting amount of the gain based on the estimation of the excess or deficiency of the gain.

5. A bar-code reader comprising:

a sensor;

the signal processing device according to claim 1; and a decoder, wherein the signal processing device is also configured to treat an output signal of the sensor as an input signal supplied to the signal processing device, and the decoder is configured to treat an output signal of the signal processing device as an input signal supplied to the decoder.

6. A signal processing method comprising:

a step in which, a variable amplifier outputs a signal, as an output signal thereof, corresponding to an input signal, an offset and a gain of the variable amplifier being able to be adjusted;

a step in which, a comparing means compares a level of the output signal of the variable amplifier with a plurality of thresholds;

a step in which, a detecting means detects either or both of a shift of the offset of the variable amplifier and an excess or deficiency of the gain of the variable amplifier based on the result of the comparison executed in the comparing means; and a step in which, an adjusting means adjusts either or both of the offset and the gain of the variable amplifier based on the result of the detection executed in the detecting means, wherein the detecting means utilizes, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

7. A signal processing program for causing a computer to function as an output signal's wave shape adjusting device for adjusting an output signal from a variable amplifier configured to output a signal, as an output signal thereof, corresponding to an input signal, an offset and a gain of the variable amplifier being able to be adjusted, the program causing the computer to function as:

a comparing means configured to compare a level of the output signal of the variable amplifier with a plurality of thresholds;

a detecting means configured to detect either or both of a shift of the offset of the variable amplifier and an excess or deficiency of the gain of the variable amplifier based on the result of the comparison executed in the comparing means; and an adjusting means configured to adjust either or both of the offset and the gain of the variable amplifier based on the result of the detection executed in the detecting means, wherein the detecting means is also configured to utilize, as the result of the comparison for each of the plurality of thresholds, a number of times selected from a group consisting of a first number of times that the level of the output signal changes from a level below the threshold to a level over the threshold in a predetermined period, the second number of times that the level of the output signal changes from the level over the threshold to the level below the threshold in the predetermined period, and a third number of times which is a sum of the first number of times and the second number of times, said number of times being similarly selected among the plurality of thresholds.

* * * * *